US005878779A

United States Patent [19]

Bircann et al.

[11] Patent Number: 5,878,779

[45] **Date of Patent: *Mar. 9, 1999**

[54] ACTUATOR HOUSING

[75] Inventors: Raul Armando Bircann, Penfield; Dwight Orman Palmer, Rochester; Paul Francis Danahy, Hilton, all of N.Y.

[73] Assignee: General Motors Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 705,231

[22] Filed: Aug. 29, 1996

[51] Int. Cl.[6] .......................... F02M 25/07; F16K 49/00; F16K 37/00; F16K 31/06

[52] U.S. Cl. .................... 137/554; 137/338; 251/129.15; 123/571

[58] Field of Search .................................... 137/338, 554; 251/129.15; 123/571

[56] References Cited

U.S. PATENT DOCUMENTS

| | | | |
|---|---|---|---|
| 4,130,094 | 12/1978 | Gropp | 123/571 |
| 4,473,056 | 9/1984 | Ishida et al. | 123/571 |
| 4,674,464 | 6/1987 | Akagi | 123/571 |
| 4,690,120 | 9/1987 | Egle | 123/571 |
| 4,708,316 | 11/1987 | Cook | 123/571 |
| 4,782,811 | 11/1988 | Hewette et al. | 123/571 |
| 4,961,413 | 10/1990 | Grey et al. | 123/571 |
| 5,020,505 | 6/1991 | Grey et al. | 123/571 |
| 5,129,623 | 7/1992 | Lockwood | 123/571 |
| 5,435,519 | 7/1995 | Everingham | 251/129.15 |
| 5,460,146 | 10/1995 | Frankenberg | 251/129.15 X |
| 5,467,962 | 11/1995 | Bircann et al. | 251/129.15 |
| 5,494,255 | 2/1996 | Pearson et al. | 251/129.15 |
| 5,626,165 | 5/1997 | Shinobu | 137/554 X |
| 5,680,880 | 10/1997 | Miyake et al. | 137/338 |
| 5,685,519 | 11/1997 | Bircann et al. | 251/129.15 |
| 5,687,698 | 11/1997 | Mastro et al. | 123/571 |

FOREIGN PATENT DOCUMENTS

WO95/19497 7/1995 WIPO .

*Primary Examiner*—John Rivell
*Attorney, Agent, or Firm*—Karl F. Barr, Jr.

[57] ABSTRACT

An EGR valve useful for metering exhaust gas to the intake of an internal combustion engine is disclosed. The EGR valve includes a base member through which exhaust gas passes and in which is disposed a valve member. An actuator housing is constructed with integral, hollow leg members for mounting the actuator to the base and also includes a valve stem passage which sealingly engages an opening in the base to provide a leak-free passage for the valve from the base to the actuator. A solenoid assembly disposed within the housing includes a bottom portion which is configured with openings to support fasteners which pass through the bottom and the hollow housing legs to engage corresponding faster openings in the base to fix the actuator housing to the base by placing the legs in compression thereagainst. In addition the housing includes integral venting features which allow the housing interior to remain in communication with atmospheric pressure when said valve passage is exposed to manifold vacuum thereby preventing contamination of the solenoid actuator with exhaust gas from the exhaust gas passage.

4 Claims, 3 Drawing Sheets

ACTUATOR HOUSING

TECHNICAL FIELD

The invention relates to an exhaust gas recirculation valve for regulating the flow of exhaust gas to an internal combustion engine and, particularly, to an actuator and housing assembly for such a valve.

BACKGROUND OF THE INVENTION

An exhaust gas recirculation (EGR) valve is typically used with automotive internal combustion engines to meter exhaust gas from a source such as the exhaust manifold to the intake manifold where the exhaust gas is introduced to the combustion air charge to assist in the reduction of regulated exhaust constituents. The harsh underhood environment of an automobile exposes the EGR valve to high temperatures both from the internal flow of exhaust gas and external engine temperatures. Additionally, high levels of vibration, dirt and moisture require an EGR assembly which is immune to contamination from external as well as internal sources.

Electromagnetic solenoid actuators used in state-of-the-art exhaust gas recirculation valves can be sensitive to high temperatures which are transferred from the exhaust gas passing through the valve. Attempts to isolate the actuators have resulted in contamination concerns, especially in the area of valve stem entry to the actuator housing. Actuator mounting to the valve base presents a challenge due to the high vibrational loads experienced by the mounting hardware and associated durability concerns.

In certain sealed actuator housings, exhaust gas enters the actuator because the actuator resides at intake manifold pressure (vacuum) in the valve-closed mode. During closed-open valve transitions, exhaust is drawn into the actuator by the vacuum condition until an equilibrium condition exists. As a result, hot moisture-laden exhaust gas may be drawn into the actuator housing to condense on the lower temperature solenoid assembly causing a potential for corrosion.

SUMMARY OF THE INVENTION

The present invention is directed to a housing assembly for use in mounting an electromagnetic actuator to the base of an EGR valve. It is an object of the present invention to provide an actuator housing which utilizes integral, hollow mounting legs and a valve stem housing which can be sealed to the EGR valve base to prevent valve contamination from external sources while providing pressure balancing features operable to prevent pressure differentials across the actuator housing. Such pressure differentials can operate to internally contaminate the valve actuator through the ingress of exhaust gas in certain applications of high exhaust backpressure and inherent, high peak pressure transients.

The present invention utilizes an extruded housing having hollow legs which extend outwardly from the bottom for mounting to the valve base. The hollow legs operate to insulate the housing interior from the heat of the base, caused by exhaust gas passage, while avoiding the durability issues inherent in separate legs which must be assembled and may present tolerance and alignment concerns. Assembly of the housing to the base is through the use of fasteners which extend through, and are anchored in the primary pole member. The fasteners engage complementary openings in the base member and draw the integral hollow actuator legs into compression, creating an easily assembled and robust base unit which is durable in an environment of high vibrational input.

A hollow valve stem passage extends from the actuator housing and engages an associated valve stem opening in the base to provide a sealed passage for the valve stem. Such a sealed passage avoids contamination at the valve stem-actuator interface. Pressure equalizing the actuator precludes the possibility of sustaining manifold pressure by introducing a fresh air bleed past the solenoid and into the engine intake manifold, eliminating the potential of drawing exhaust gas into the actuator. The mechanism for providing pressure equalization includes a vent port provided in the lower portion of the actuator housing to maintain the actuator housing at atmospheric pressure, avoiding manifold vacuum conditions and the ingress of exhaust gas into the actuator. An upper vent assembly may be provided as part of the pintle position sensor at the uppermost location of the actuator. A vent port at the top of the actuator allows the air volume above the actuator to be expelled to atmosphere during closing of the valve when the actuator moves in an upward direction.

Other objects and features of the present invention will become apparent by reference to the following description and to the drawings.

DESCRIPTION OF THE PREFERRED EMBODIMENT

Figure 1:
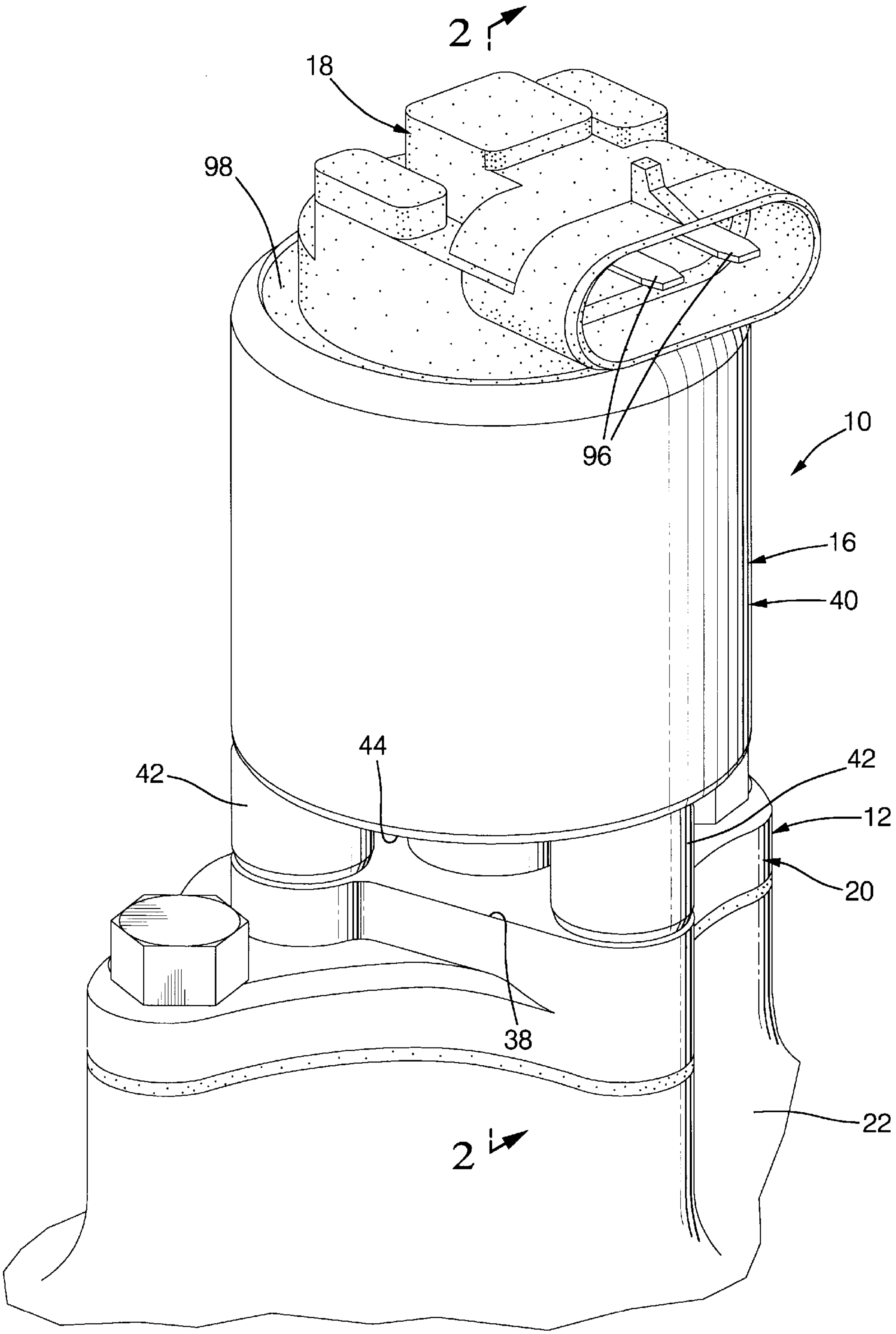
FIG. 1 is a perspective view of an EGR valve embodying features of the present invention.

In FIG. 1, there is shown an electromagnetic solenoid actuated exhaust gas recirculation (EGR) valve, designed generally as 10, for metering exhaust gas to the intake manifold of an internal combustion engine. The EGR valve includes a base assembly 12, a valve assembly 14, an electromagnetic solenoid actuator 16 and a pintle position sensor 18. The base assembly includes a housing 20 which mounts the valve to engine 22 and which includes openings 24 and 26 which are interconnected by an exhaust gas passage 28 through which exhaust gas flows from the exhaust manifold to the intake manifold of the engine 22. A valve seat 30 surrounds opening 26 and receives a poppet valve member 32 for movement, into and out of engagement therewith, to regulate the flow of exhaust gas through the passage 28. The valve member includes a valve stem 34 which extends through an opening 36 in the top 38 of the valve housing 20 for attachment to the actuator assembly 16.

The actuator assembly 16 includes a cylindrical housing 40 which, in a preferred embodiment, is constructed of deep drawn sheet with integral hollow support legs 42 extending from the housing bottom 44 for engagement with the top 38 of the base housing 20. The hollow leg members 42 operate to attach the actuator 16 to the base assembly 12 while insulating the actuator assembly from the high temperatures of the base. Also extending from the bottom 44 of the actuator housing 40 is a stepped cylindrical extension 46 which is configured for sliding and sealing disposition within the valve stem opening 36 in the top 38 of the base housing 20. An opening 48 in the end of the extension 46 allows the valve stem 34 to pass coaxially therethrough and into the interior of the cylindrical actuator housing 40. A bearing member 50 is disposed within the stepped extension 46 and is operable to position the valve stem 34 coaxially within the extension 46 as well as to seal the housing interior against exhaust gas entry from passage 28.

The actuator assembly also includes a solenoid assembly 52 disposed within the interior of the housing 40. The solenoid assembly 52 includes a cup shaped, primary pole piece 54 which is slidingly inserted into the housing interior and which is defined by axially extending cylindrical sides 56 defining an open upper end 58, as viewed in the figures, an annular bottom portion 60 defining a centrally disposed opening 62 for the passage of valve stem 34 and a cylindrical primary pole 64 disposed about the central opening 62 and extending axially from the bottom portion 60 to terminate intermediate of the bottom and the open upper end 58. A coil and bobbin assembly 66 is supported by the annular bottom 60 of the primary pole piece 54. Spaced about the annular bottom 60 of the primary pole piece 54, in associated alignment with each of the hollow leg members 42 are through bores 68 each surrounded by fastener seats 70. Fasteners such as bolts 72 extend through the bores 68 and associated legs 42 to engage corresponding, threaded openings 74 in the top 38 of the base housing 20. Tightening of the bolts 72 will operate to fix the actuator assembly 16 to the base housing 20 by placing the fasteners 72 in tension while the hollow legs 42 of the actuator housing 40 are conversely placed in compression. Compression of the legs against the base unit provides a robust mounting scheme which is resistant to vibrational failure.

A secondary pole piece 76 includes a cylindrical secondary pole 78 which extends into the interior of the primary pole piece 54 in coaxial, spaced relationship to the primary pole 64. A flange 80 extending outwardly from the upper end of the secondary pole 78 operates to close the open upper end 58 of the cup shaped primary pole piece 54. An axial chamber 82 is defined by the inner walls 84 and 86 of the coaxially aligned primary and secondary poles 64 and 78, respectively and is configured to receive, for reciprocable travel therein, a cylindrical armature 88. The armature 88 is configured for attachment to the distal end of the valve stem 34 and is biased, by return spring 90, seated between the bearing member 50 and the armature 88, so as to locate the valve member 32 in a normally closed position against the valve seat 30.

Closing the actuator housing 40 is a pintle position sensor 18. The sensor 18 has a biased follower 94 which contacts the upper surface of the armature 88 and moves in concert with the armature and valve assembly to track the valve position relative to the valve seat 30. The position of the valve 32 is translated into an electrical signal by the position sensor 18 and transmitted, via the electrical connection 96, to an appropriate controller (not shown). The position sensor 18 includes a flanged rim 98 which, along with a resilient sealing member 100, seals the interior of the actuator housing 40 against ingress of external contaminants.

Figure 2:
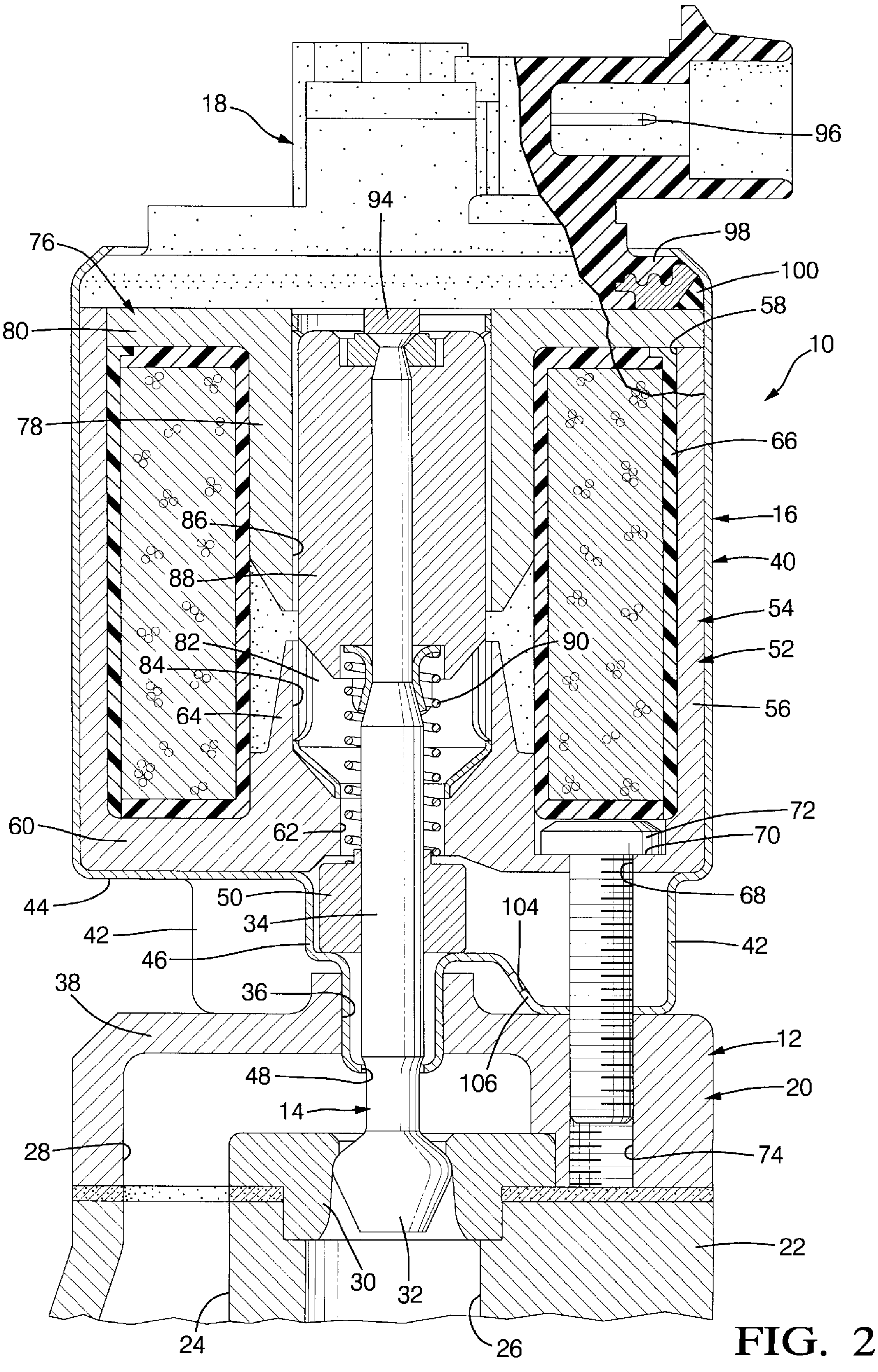
FIG. 2 is a sectional view of the valve of FIG. 1, taken along line 2—2.

A vent port 104, FIG. 2, is provided in the lower portion of the actuator housing 40. The vent part 104 is configured as an opening in the downwardly extending, integral hollow support leg 42 and is located on the inside face of the web 106 connecting each of the legs 42 to the stepped cylindrical valve extension 46. Location of the vent opening 104 in the leg member 42 prevents the actuator housing from being maintained at manifold vacuum while allowing the drainage of liquid entering the actuator. The integral leg members 42 are capable of functioning as a collecting point for such moisture while the opening 104 in the leg will prevent moisture collection above the level thereof. In addition, moisture collecting in the legs is subject to high temperature levels due to the contact between the legs 42 and the valve base 12 which will operate to vaporize and vent to the exterior of the valve through opening 104, any collected moisture.

Figure 3:
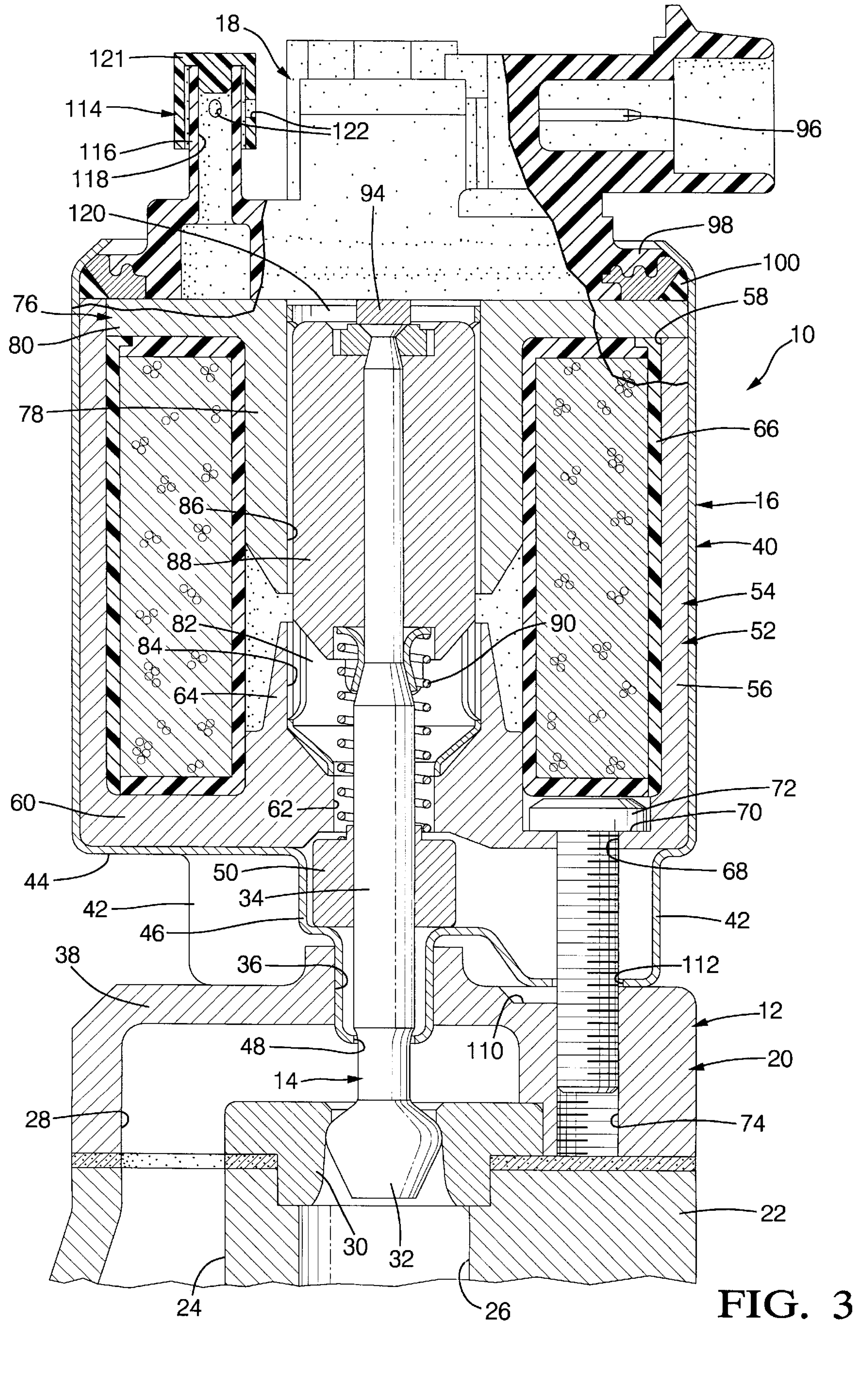
FIG. 3 is a sectional view of a second embodiment of the valve of FIG. 1.

An alternate embodiment of the actuator housing vent 104 is shown in FIG. 3 and includes a port 110, formed in the top 38 of the base housing 20, which is located adjacent each actuator mounting leg 42. Enlarged fastener openings 112 allow communication between the interior of the actuator housing 40 and atmosphere through the port 110. The port 110 provides for effective drainage of any moisture collected within the actuator housing. The enlarged opening 112 in the housing leg 42 does not affect the performance of the mounting system as the legs 42 are maintained in compression by the fasteners 72 in cooperation with the primary pole piece 54 and the base housing 20.

Should additional venting of the actuator housing 40 be required, a venting assembly 114 may be located integrally with upper pintle position sensor 18 and includes a vent stack 116 having a centrally extending passage 118. The passage 118 is in fluid communication with the space 120 defined above the armature 88. The passage 118 is capped with a cover sleeve 121 and includes vent openings 122 which extend through the passage wall to connect the interior of the housing with the atmosphere. The additional vent assembly 114 allows the air volume in space 120 above the armature 88 to be expelled to the exterior of the EGR valve 10 during the closing or upward stroke of the valve assembly 14. Equalizing pressure above the armature 88, and through the dedicated vent passage 114, prevents any moisture within the actuator housing 40 from permeating the position sensor 18 and damaging its low-current circuitry.

The foregoing description of the preferred embodiments of the invention has been presented for the purpose of illustration and description. It is not intended to be exhaustive nor is it intended to limit the invention to the precise forms disclosed. It will be apparent to those skilled in the art that the disclosed embodiments may be modified in light of the above teachings. The embodiments described were chosen to provide an illustration of the principles of the invention and of its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A valve assembly for metering exhaust gas to the intake system of an internal combustion engine comprising a base housing having an exhaust gas passage in flow communication with intake manifold pressure and exhaust manifold pressure of the internal combustion engine, said exhaust gas passage having a valve disposed therein for regulating exhaust flow therethrough, said valve member including a valve stem extending through a valve stem opening in said base housing, an actuator housing having an interior defined by a first open end, sides and a closed bottom having integral leg members and a centrally disposed, stepped cylindrical extension, extending outwardly therefrom, said leg members associated with openings in said base housing and cooperable with fasteners extending through bottoms of said integral leg members to thereby engage said base openings to attach said actuator housing to said base housing, and said stepped cylindrical extension slideably and sealingly disposable in said valve stem opening in said base housing to define a sealed valve passage for said valve stem between said base housing and said actuator housing and to place the interior of said housing in communication with said intake manifold pressure and said exhaust manifold pressure of said exhaust gas passage, a solenoid actuator disposed in said actuator housing including an axially reciprocable armature configured for attachment to said valve stem, and a pintle position sensor closing said open end of said actuator housing, said actuator housing including a vent opening in one of said integral leg members operable to maintain the interior of said actuator housing in communication with atmospheric pressure to thereby avoid contamination of said solenoid actuator by exhaust gas due to vacuum conditions in said actuator housing.

2. A valve assembly for metering exhaust gas to the intake manifold of an internal combustion engine, as defined in claim 1, said vent opening is said integral leg member located adjacent the bottom of said leg member and operable to expel moisture collected therein.

3. A valve assembly for metering exhaust gas to the intake system of an internal combustion engine, as defined in claim 1, said pintle position sensor including a venting assembly operable to fluidly connect air space above said armature with atmospheric pressure to allow said air space to be expelled from said housing when said armature moves in said solenoid actuator, said venting assembly including a dedicated passage through said pintle position sensor wherein moisture is prevented from permeating said position sensor.

4. A valve assembly for metering exhaust gas to the intake system of an internal combustion engine, as defined in claim 1, said solenoid actuator including a bottom portion having through bores, in associated alignment with said integral leg members, said fasteners extending through said bores and said associated leg members to engage said corresponding openings in said housing base and operable to fix said actuator housing to said base housing wherein said fasteners are placed in tension and said leg members are placed in compression.

* * * * *